United States Patent
Biegelsen et al.

(10) Patent No.: US 11,738,393 B2
(45) Date of Patent: Aug. 29, 2023

(54) BUILD PLATES FOR ADDITIVE MANUFACTURING SYSTEMS AND METHODS FOR THE SAME

(71) Applicant: XEROX CORPORATION, Norwalk, CT (US)

(72) Inventors: David K. Biegelsen, Portola Valley, CA (US); Scott E. Solberg, San Jose, CA (US); David Mathew Johnson, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/189,667

(22) Filed: Mar. 2, 2021

(65) Prior Publication Data

US 2022/0281007 A1 Sep. 8, 2022

(51) Int. Cl.
| | | |
|---|---|---|
| *B22F 10/43* | (2021.01) | |
| *B29C 64/40* | (2017.01) | |
| *B29C 64/245* | (2017.01) | |
| *B22F 10/47* | (2021.01) | |
| *B33Y 40/00* | (2020.01) | |
| *B33Y 30/00* | (2015.01) | |

(52) U.S. Cl.
CPC .............. *B22F 10/47* (2021.01); *B22F 10/43* (2021.01); *B29C 64/245* (2017.08); *B29C 64/40* (2017.08); *B33Y 30/00* (2014.12); *B33Y 40/00* (2014.12)

(58) Field of Classification Search
CPC ....... B22F 10/47; B29C 64/245; B29C 64/40; B33Y 30/00
See application file for complete search history.

(56) References Cited

U.S. PATENT DOCUMENTS

| | | | |
|---|---|---|---|
| 2008/0038922 A1 | 2/2008 | Lamers et al. | |
| 2011/0076785 A1* | 3/2011 | Xiao | H01L 43/08 257/E21.001 |
| 2012/0057216 A1* | 3/2012 | Flores | B81C 1/00476 359/290 |
| 2016/0240003 A1* | 8/2016 | Frayne | B29C 64/364 |
| 2018/0022044 A1* | 1/2018 | Dulkiewicz | B29C 64/00 425/375 |
| 2018/0361473 A1* | 12/2018 | Beacham | B33Y 50/02 |
| 2019/0077054 A1 | 3/2019 | Jennsen et al. | |
| 2019/0160734 A1* | 5/2019 | Biesboer | B33Y 10/00 |
| 2019/0193155 A1* | 6/2019 | Olausson | B29C 64/245 |
| 2020/0061914 A1 | 2/2020 | Onishi | |
| 2022/0068825 A1 | 3/2022 | Chen et al. | |

OTHER PUBLICATIONS

Bolted joint. https://web.archive.org/web/20100327222420/https://en.wikipedia.org/wiki/Bolted_joint (Year: 2010).*
V-Flash User Guide 2008 (Year: 2008).*

* cited by examiner

*Primary Examiner* — Seyed Masoud Malekzadeh
*Assistant Examiner* — Farah Taufiq
(74) *Attorney, Agent, or Firm* — MH2 Technology Law Group LLP

(57) ABSTRACT

A build plate for an additive manufacturing device and methods for the same are provided. The build plate may include a base and a sacrificial plate coupled with the base. The etch rate of the sacrificial plate in an etchant may be greater than an etch rate of the base in the etchant. A method for separating a 3D printed article supported on the build plate may include contacting the sacrificial plate with the etchant.

15 Claims, 6 Drawing Sheets

BUILD PLATES FOR ADDITIVE MANUFACTURING SYSTEMS AND METHODS FOR THE SAME

TECHNICAL FIELD

The presently disclosed embodiments or implementations are directed to build plates for additive manufacturing systems and method for the same.

BACKGROUND

Liquid metal jet printing, such as magnetohydrodynamic (MHD) liquid metal jet printing, includes ejecting liquid or molten metal drops from a printhead to a substrate, which may be a heated build plate or a previously deposited metal, to form a workpiece or printed article. As the metal drops contact the substrate, the metal drops cool to form the article. While systems and methods for liquid metal jet printing have made great progress, conventional systems and methods for separating the article and the build plate from one another often damage the article. For example, conventional methods to separate the article and the build plate may include fracturing or sawing the article from the build plate, which often damages complex and delicate features of the article proximal or adjacent to the build plate. Another conventional method to separate the article and the build plate may include quenching the article and the build plate in cold water and relying on a mismatch between the thermal contraction of the article and the build plate, which is a violent process that may potentially damage the article and shorten the useful lifetime of the build plate.

What is needed, then, are improved build plates for liquid metal jet printing systems and methods for the same.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide a build plate for an additive manufacturing device including a base and a sacrificial plate coupled with the base. The etch rate of the sacrificial plate in an etchant may be greater than an etch rate of the base in the etchant.

In some examples, the build plate may be configured to support a 3D printed article. The etch rate of the sacrificial plate in the etchant may be greater than an etch rate of the 3D printed article in the etchant.

In some examples, a ratio of the etch rate of the sacrificial plate to the etch rate of the base may be greater than or equal to about 10.

In some examples, a ratio of the etch rate of the sacrificial plate to the etch rate of the base may be greater than or equal to about 100.

In some examples, the sacrificial plate may include one or more protuberances extending through at least a portion of the base and configured to at least partially couple the sacrificial plate with the base.

In some examples, the one or more protuberances may extend through an entire dimension of the base.

In some examples, at least one of the protuberances may define threading configured to facilitate the coupling of the sacrificial plate with the base.

In some examples, the one or more protuberances may extend through a portion of the base.

In some examples, the base and the sacrificial plate may be coupled with one another via a vacuum pressure.

In some examples, the base and the sacrificial plate may be coupled with one another via one or more mechanical fasteners.

In some examples, the mechanical fasteners may include one or more of a threaded stud, a bolt, a clamp, or combinations thereof.

In some examples, the sacrificial plate may have or include a thickness of from about 0.1 µm to about 5 mm.

In some examples, the sacrificial plate may be coupled with the base via electroplating, electroless plating, chemical bonding, or dip coating.

The present disclosure may provide an additive manufacturing layering device including a print head and any build plate disclosed herein disposed proximal the print head.

The present disclosure may provide a method for separating a 3D printed article and a build plate from one another. The 3D printed article may be coupled with the sacrificial plate of the build plate. The method may include contacting the sacrificial plate with the etchant.

In some examples, the method may further include separating the sacrificial plate and the base of the build plate from one another prior to contacting the sacrificial plate with the etchant.

In some examples, contacting the sacrificial plate with the etchant may include disposing the sacrificial plate and the 3D printed article coupled therewith in a vessel containing the etchant.

In some examples, an inner surface of the vessel may define a recess configured to support the sacrificial plate.

In some examples, the method may further include disposing a support in the vessel. The support may be configured to support the 3D printed article upon separation from the sacrificial plate.

In some examples, the sacrificial plate may be disposed in the vessel such that the sacrificial plate defines an upper volume and a lower volume in the vessel. The sacrificial plate may substantially prevent fluid communication between the upper volume and the lower volume. The etchant may be disposed in the upper volume.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

Figure 1:
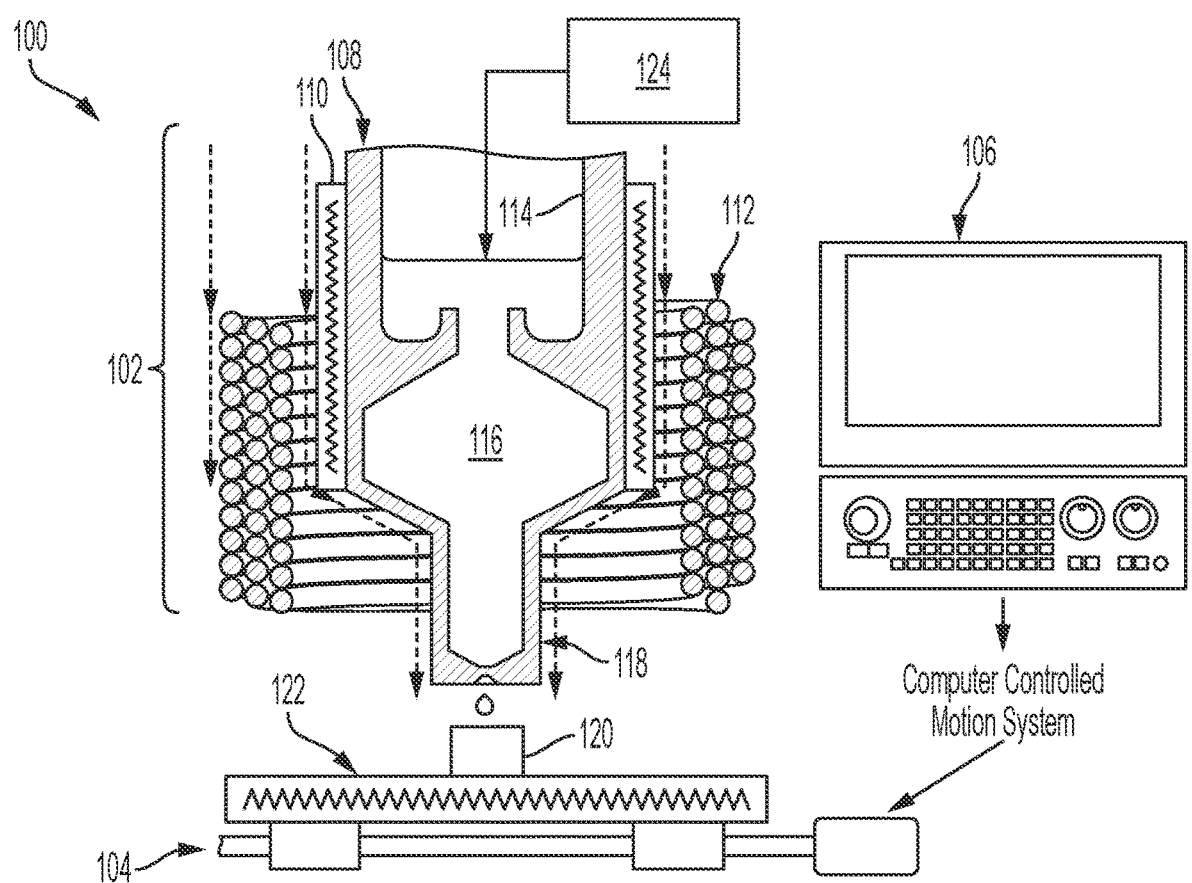
FIG. 1 illustrates a schematic cross-sectional view of an exemplary additive manufacturing layering device or 3D printer, according to one or more implementations disclosed.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure is directed to build plates for additive manufacturing devices or 3D printers, and methods for the same. Particularly, the present disclosure is directed to improved build plates for 3D printers and methods for removing 3D printed articles from the build plates without damaging the 3D printed articles. As further described herein, the improved build plates may include or be at least partially fabricated from a sacrificial material capable of or configured to be etched, solvated, or otherwise dissolved in a solution (e.g., etchant) to separate the 3D printed article attached to the build plate.

FIG. 1 illustrates a schematic cross-sectional view of an exemplary additive manufacturing layering device or 3D printer 100, according to one or more implementations. The 3D printer 100 may be a liquid metal jet printing system, such as a magnetohydrodynamic (MHD) printer. It should be appreciated, however, that any additive manufacturing device and any printable material may utilize the implementations disclosed herein. The 3D printer 100 may include a printhead 102, a stage 104, a computing system 106, or any combination thereof. The computing system 106 may be operably and/or communicably coupled with any one or more of the components of the 3D printer 100. The computing system 106 may be capable of or configured to operate, modulate, instruct, receive data from, or the like from any one or more of the components of the 3D printer 100. The printhead 102 may include a body 108, which may also be referred to herein as a pump chamber, one or more heating elements (one is shown 110), one or more metallic coils 112, other means for ejecting molten or melted droplets, or any combination thereof, operably coupled with one another. As illustrated in FIG. 1, the heating elements 110 may be at least partially disposed about the body 108, and the metallic coils 112 may be at least partially disposed about the body 108 and/or the heating elements 110. The body 108 may have an inner surface 114 defining an inner volume 116 thereof. The body 108 may define a nozzle 118 disposed at a first end portion of the body 108.

The stage 104 may be disposed proximal the printhead 102 and capable of or configured to support a workpiece or article 120 formed or fabricated by the 3D printer 100. For example, as illustrated in FIG. 1, the stage 104 may include a platen (e.g., heated platen) or a build plate 122 disposed below the printhead 102 and capable of or configured to support the article 120 fabricated by the 3D printer 100. The build plate 122 may be detachable from the stage 104. As further described herein, the build plate 122 may include one or more features capable of or configured to facilitate the removal of the article 120 from the build plate 122.

In an exemplary operation of the 3D printer 100 with continued reference to FIG. 1, a build material (e.g., metal) from a source 124 may be directed to the inner volume 116 of the body 108. The heating elements 110 may at least partially melt the build material contained in the inner volume 116 of the body 108. For example, the build material may be a solid, such as a solid metal, and the heating elements 110 may heat the body 108 and thereby heat the build material from a solid to a liquid (e.g., molten metal). The metallic coils 112 may be coupled with a power source (not shown) capable of or configured to facilitate the deposition of the build material on the build plate 122. For example, the metallic coils 112 and the power source coupled therewith may be capable of or configured to generate a magnetic field, which may generate an electromotive force within the body 108, thereby generating an induced electrical current in the molten metal disposed in the body 108. The magnetic field and the induced electrical current in the molten metal may create a radially inward force on the liquid metal, known as a Lorentz force, which creates a pressure at the nozzle 118. The pressure at the nozzle 118 may expel the molten metal out of the nozzle 118 toward the build plate 122 in the form of one or more drops.

The drops may then cool and solidify to thereby adhere to the build plate 122 and form at least a portion of the article 120.

Figure 2A:
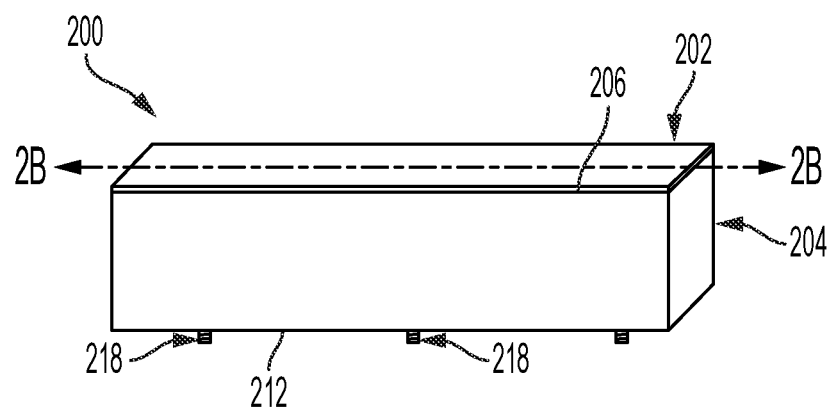
FIG. 2A illustrates a perspective view of an exemplary build plate including a sacrificial plate and a base that may be utilized in the 3D printer of FIG. 1, according to one or more implementations disclosed.
Figure 2B:
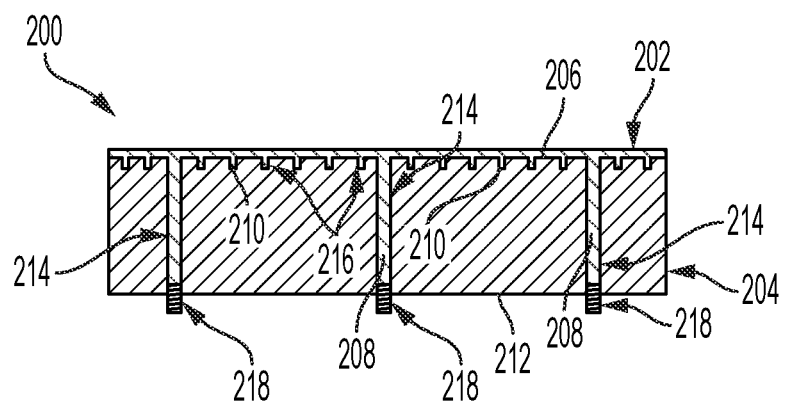
FIG. 2B illustrates a cross-sectional view of the exemplary build plate of FIG. 2A, according to one or more implementations disclosed.

FIG. 2A illustrates a perspective view of an exemplary build plate 200 that may be utilized in the 3D printer 100 of FIG. 1, according to one or more implementations. FIG. 2B illustrates a cross-sectional view of the exemplary build plate 200 of FIG. 2A, according to one or more implementations. As illustrated in FIGS. 2A and 2B, the build plate 200 may include a sacrificial plate 202 and a base 204. The sacrificial plate 202 may be disposed adjacent at least a portion of the base 204 such that the sacrificial plate 202 at least partially covers a surface 204 thereof. For example, as illustrated in FIG. 2A, the sacrificial plate 202 may at least partially cover a top surface 206 of the base 204. The sacrificial plate 202 may have a thickness of from about 0.1 μm to about 5 mm.

The sacrificial plate 202 and the base 204 may be coupled with one another. In at least one implementation, the sacrificial plate 202 and the base 204 may be detachably coupled with one another. It should be appreciated that the sacrificial plate 202 and the base 204 may be detachably coupled with one another via any suitable means. For example, the sacrificial plate 202 and the base 204 may be detachably coupled with one another via one or more mechanical fasteners. Illustrative mechanical fasteners may be or include, but are not limited to, one or more bolts, studs and nuts, clamps, threaded studs, and/or any other known mechanical fasteners. In another example, the sacrificial plate 202 and the base 204 may be bonded with one another (e.g., metallurgically bonded, chemically bonded, etc.). In another example, the sacrificial plate 202 and the base 204 may be bonded with one another by vacuum pressure. The vacuum pressure may include utilizing a vacuum pressure from a vacuum source less than the ambient pressure such that the vacuum pressure is capable of or configured to couple the sacrificial plate 202 and the base 204 with one another.

In an exemplary implementation, illustrated in FIGS. 2A and 2B, the sacrificial plate 202 may include one or more protuberances 208, 210 capable of or configured to facilitate the coupling with the base 204. The sacrificial plate 202 may include any number of protuberances 208, 210 sufficient to couple the sacrificial plate 202 with the base 204. The one or more protuberances 208, 210 of the sacrificial plate 202 may extend through at least a portion of the base 204. In at least one implementation, the sacrificial plate 202 may include at least one protuberance 208 extending through the base 204. For example, as illustrated in FIG. 2B, the sacrificial plate 202 may include at least one protuberance 208 extending through the entire dimension (e.g., thickness, length, width, depth) of the base 204. In another example, illustrated in FIG. 2B, the sacrificial plate 202 may include at least one protuberance 210 extending partially through the base 204. The protuberances 208 extending through the entire dimension of the base 204 may allow the sacrificial plate 202 to be clamped or fastened proximal a bottom surface 212 of the base 204 to thereby facilitate the coupling of the sacrificial plate 202 with the base 204. The protuberances 208, 210 may at least partially prevent separation or movement between the sacrificial plate 202 and the base 204. For example, the protuberances 208, 210 may prevent lateral movement or sliding between the sacrificial plate 202 and the base 204.

The base 204 may define one or more holes 214, 216 at least partially extending therethrough from the top surface 206 toward the bottom surface 212 thereof. As illustrated in FIG. 2B, at least one of the holes 204 may extend through the entire dimension of the base 202 from the top surface 206 to the bottom surface 212 to thereby provide through holes 214. As further illustrated in FIG. 2B, at least one of the holes 216 may only extend partially through the base 204 to thereby provide blind holes or pockets 216.

The one or more holes 214, 216 may be capable of or configured to receive the one or more protuberances 208, 210 to facilitate the coupling between the sacrificial plate 202 and the base 204. The size and/or shape of the one or more holes 214, 216 and/or the protuberances 208, 210 may be controlled or modified to facilitate the coupling between the sacrificial plate 202 and the base 204. For example, the one or more holes 214, 216 may be sized and/or shaped to provide a friction or interference fit with the respective protuberances 208, 210 of the sacrificial plate 202.

The one or more protuberances 208, 210 may be capable of or configured to facilitate the coupling of the sacrificial plate 202 and the base 204 with one another. For example, the one or more protuberances 208, 210 may be sized and/or shaped to provide a friction or interference fit with the respective holes 214, 216 of the base 204. In another example, the one or more protuberances 208, 210 may include one or more mechanical or physical features capable of or configured to facilitate the coupling of the sacrificial plate 202 with the base 204. For example, as illustrated in FIG. 2B, one or more of the protuberances 208, 210 may include or define crush ribs or threading 218 along respective lengths thereof to thereby provide an interference or press fit between the sacrificial plate 202 and the base 204. The threading 218 may exert a radial force or load against the base 204 to thereby provide the interference fit between the protuberances 208 and the base 204. While not illustrated, it should be appreciated that the holes 214, 216 of the base 204 may include or define crush ribs or threading (not shown) to thereby provide an interference fit with the protuberances 208, 210.

Figure 2C:
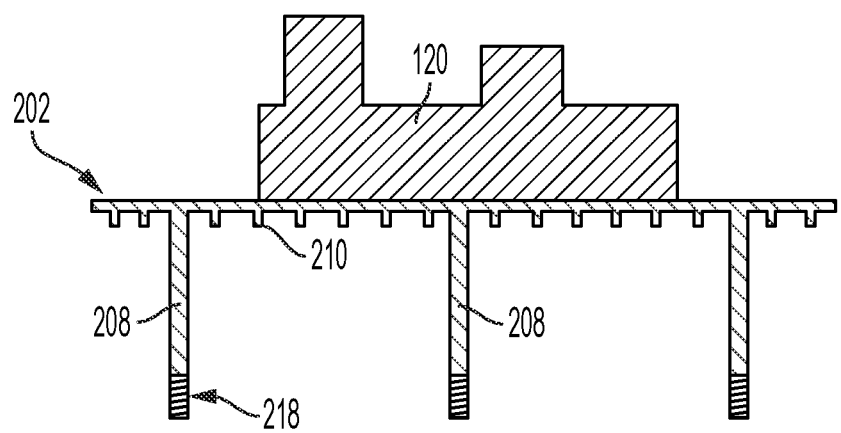
FIG. 2C illustrates a cross-sectional view of the sacrificial plate of FIG. 2A separated from the base and supporting a 3D printed article, according to one or more implementations disclosed.

FIG. 2C illustrates a cross-sectional view of the sacrificial plate 202 of FIG. 2A separated from the base 204 and supporting the article 120, according to one or more implementations. The sacrificial plate 202 may be separated from the base 204 through any suitable means. For example, the sacrificial plate 202 and the base 204 may be separated from one another by applying a biasing force or load in opposing directions. In another example, the sacrificial plate 202 and the base 204 may be separated from one another by removing any mechanical fasteners (e.g., clamps) coupling the sacrificial plate 202 and the base 204 with one another.

In at least one implementation, the build material of the article 120 (e.g., build material disposed in the source 124) may be or include one or more metals and/or alloys thereof. Illustrative build materials may be or include, but are not limited to, aluminum, aluminum alloys, brass, bronze, chromium, cobalt-chrome alloys, copper, copper alloys, iron alloys (Invar), nickel, nickel alloys (INCONEL®), nickel-titanium alloys (Nitinol), stainless steel, tin, titanium, titanium alloys, gold, silver, molybdenum, tungsten, or the like, or alloys thereof, or any combination thereof.

The base 204 may be fabricated from one or more metals and/or alloys. Illustrative metals and/or alloys may be or include, but are not limited to, aluminum, aluminum alloys, brass, bronze, chromium, cobalt-chrome alloys, copper, copper alloys, iron alloys (Invar), nickel, nickel alloys (INCONEL®), nickel-titanium alloys (Nitinol), stainless steel, tin, titanium, titanium alloys, gold, silver, molybdenum, tungsten, or the like, or alloys thereof, or any combination thereof. In an exemplary implementation, the base 204 is fabricated from aluminum.

The sacrificial plate 202 may be fabricated from one or more sacrificial materials, an alloy incorporating one or more sacrificial materials, and/or a composite incorporating one or more sacrificial materials. The sacrificial materials may have an etch rate relatively greater than an etch rate of the article 120 and/or the base 204. For example, the sacrificial materials of the sacrificial plate 204 may have an etch rate at least 50% greater, at least 75% greater, at least 100% greater, at least 500% greater, at least 1,000 greater, at least 5,000% greater, or at least 10,000% greater than the article 210 and/or the base 204. Illustrative sacrificial materials may be or include, but are not limited to, metals and/or alloys. Illustrative metals and/or alloys may be or include, but are not limited to, copper, tantalum, aluminum, chromium, gallium, germanium, gold, hafnium, indium, indium tin oxide, iron oxide, magnesium oxide, niobium, nichrome, nickel, palladium, tin, titanium, tungsten, or the like, or combinations and/or alloys thereof. In an exemplary implementation, the sacrificial plate 202 is fabricated from copper. In another implementation, the sacrificial plate 202 may be a composite. For example, the sacrificial plate 202 may be copper plated aluminum.

The materials utilized in the base 204 and/or the article 120 (i.e., build material of the source 124) may be different from the sacrificial material utilized for the sacrificial plate 202. In at least one implementation, the respective materials utilized in the base 204 and/or the article 120 may be determined, at least in part, by a ratio of an etch rate or etch rate ratio between the sacrificial material and the material utilized for the base 204 and/or the article 120. As used herein, the term or expression etch rate may refer to a rate in which a portion (e.g., a layer or layers) of a material is removed in the presence of an etchant or suitable solution (e.g., solvent). It should be appreciated that the etch rate may be at least partially determined by the material, the etchant or suitable solution, temperature of the etchant, other conditions (e.g., current, circulation, sonication, etc.), or combinations thereof. An etch rate ratio of the sacrificial materials utilized in the sacrificial plate 202 relative to the respective materials utilized in the base 202 and/or the article 120 may be greater than or equal to about 10, greater than or equal to about 20, greater than or equal to about 40, greater than or equal to about 100, greater than or equal to about 200, greater than or equal to about 300, greater than or equal to about 500, greater than or equal to about 1,000, greater than or equal to about 1,500, greater than or equal to about 3,000, greater than or equal to about 5,000, greater than or equal to about 7,000, greater than or equal to about 9,000, or greater than or equal to about 10,000, in a select solution (e.g., etchant), and/or under one or more conditions (e.g., heating, anodic or cathodic current, etc.).

In at least one implementation, the respective materials utilized for the article 120, the base 204, and/or the sacrificial plate 202 (e.g., the sacrificial material) may have similar or substantially similar thermal expansion coefficients (TCE). It should be appreciated that utilizing materials with similar or substantially similar TCEs may reduce or mitigate undesirable stress on the article 120, the base 204, and/or the sacrificial plate 202 during temperature changes or cycles.

In an exemplary operation of the 3D printer 100 with continued reference to FIGS. 1 and 2A-2C, the base 204 and the sacrificial plate 202 may be coupled with one another via the protuberances 208, 210 or any other suitable mechanical fasteners, as illustrated in FIGS. 2A and 2B. The 3D printer 100 may then fabricate and affix the article 120 on the build plate 200 and adjacent the sacrificial plate 202 thereof. After fabricating the article 120 on the build plate 200, the sacrificial plate 202 may be separated from the base 204 by applying a biasing force or load on the sacrificial plate 202 and the base 204 in opposing directions. The base 204 may be reused by coupling another sacrificial plate 202 therewith (e.g., via interference fit, clamp, etc.). After separation, the sacrificial plate 202 and the article 120 coupled therewith may be processed to separate the sacrificial plate 202 and the article 120 from one another. It should be appreciated that in at least one implementation, the sacrificial plate 202 may not be separated from the base 204 prior to separating the sacrificial plate 202 and the article 120 from one another. For example, the base 204 and the sacrificial plate 202 may be coupled with one another while removing or separating the article 120 from the sacrificial plate 202.

In at least one implementation, the sacrificial plate 202 and the article 120 may be separated from one another by any process capable of or configured to etch the sacrificial plate 202. For example, the sacrificial plate 202 and the article 120 may be separated from one another by wet or chemical etching with a liquid etchant or reactant, gaseous etching with a gas or vaporized etchant or reactant, plasma etching with a plasma formed with a gaseous etchant or reactant, electrochemical etching or electroetching, or any combination thereof. It should be appreciated that any etching process may be utilized and the particular etching process selected may be at least partially determined by the etch rate (e.g., Å/min, cycles, etc.), geometry (e.g., size and/or shape) of the article 120 and/or the sacrificial plate 202, exposed surface of the article 120 and/or the sacrificial plate, selectivity of the etching for the sacrificial plate 202 relative to the base 204 and/or the article 120, or the like, or any combination thereof.

In an exemplary implementation, the sacrificial plate 202 and the article 120 are separated from one another by wet or chemical etching. For example, the sacrificial plate 202 may be contacted with an etchant to remove layers thereof to thereby separate or release the article 120. In at least one implementation, the sacrificial plate 202 and the article 120 coupled therewith may be at least partially immersed in the etchant disposed in a vessel.

Figure 3:
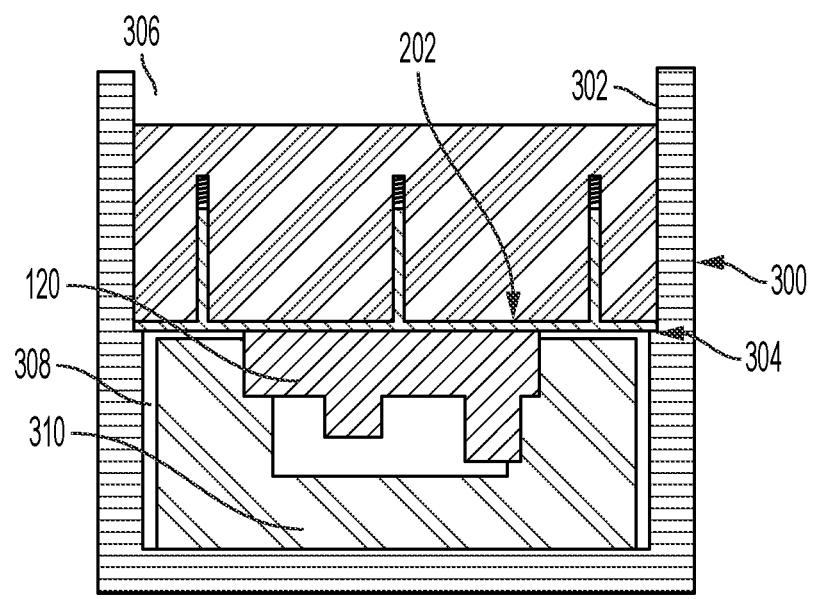
FIG. 3 illustrates the sacrificial plate and the article disposed in an exemplary vessel containing a suitable etchant, according to one or more implementations disclosed.

FIG. 3 illustrates the sacrificial plate 202 and the article 120 disposed in an exemplary vessel 300 containing a suitable etchant, according to one or more implementations. The vessel 300 may be sized and/or shaped to receive the sacrificial plate 202 and/or the article 120. In at least one implementation, illustrated in FIG. 3, an inner surface 302 of the vessel 300 may define a ledge or recess 304 capable of or configured to support the sacrificial plate 202. As further illustrated in FIG. 3, the sacrificial plate 202 may be disposed in the vessel 300 such that the sacrificial plate 202 at least partially defines an upper volume 306 and a lower volume 308 of the vessel 300. In at least one implementation, the vessel 300 may be sized and/or shaped such that the sacrificial plate 202 and the inner surface 302 of the vessel 300 at least partially form a fluid tight seal therebetween. For example, the sacrificial plate 202 may be disposed in the vessel 300 such that the upper volume 306 and the lower volume 308 of the vessel 300 are not substantially in fluid communication with one another. The recess 304 and/or a contact area at the periphery of the article 120 may provide adequate sealing either with or without the aid of a suitable gasket. As such, an etchant disposed in the upper volume 306 may not readily flow to the lower volume 308 of the vessel 300.

In an exemplary implementation, illustrated in FIG. 3, the vessel 300 may include an optional support 310 capable of or configured to support the article 120 after separation from the sacrificial plate 202. The support 310 may be sized and/or shaped to receive the article 120. For example, the size and/or shape of the support 310 may be at least partially dependent on the size and/or shape of the article 120 to thereby adequately support the article 120. The support 310 may be removeable or detachable from the vessel 300. In at least one implementation, the support 310 may be disposable. In another implementation, the support 310 may be reusable. The support 310 may be fabricated from a material having an etch rate substantially similar to or less than the article 120, the base 204, and/or the vessel 300. In an exemplary implementation, the support 310 may be fabricated from one or more polymeric materials. For example, the support 310 may be a 3D-printed, a machined, or a molded polymer support. Similarly, if the build material of the article 120 is a polymer, the support 310 (e.g., reusable support) may be fabricated from a metal or a polymer having relatively lower etch rate as compared to the article 120.

In an exemplary operation with continued reference to FIG. 3, the sacrificial plate 202 and the article 120 coupled therewith may be disposed in the vessel 300. The sacrificial plate 202 may form a substantially fluid tight seal with the inner surface 302 of the vessel 300 and at least partially define the upper and lower volumes 306, 308 in the vessel 300. An etchant may be disposed in the upper volume 306 and contacted with the sacrificial plate 202 to initiate etching. In another implementation, the etchant may be disposed in the lower volume 308 and/or the upper volume 306. In at least one implementation, the vessel 300 and/or the etchant contained therein may be at least partially heated to facilitate the etching process. In another implementation, a current, such as an anodic or cathodic current, may be applied to the etchant to facilitate the etching process. In yet another implementation, the etchant may be sonicated to facilitate the etching process. After the sacrificial plate 202 and the article 120 are separated or substantially separated from one another, the support 310 may at least partially support the article 120 and/or the article 120 may be removed from the vessel 300.

It should be appreciated that any suitable etchant, or etchants in sequence, may be utilized. Suitable etchants may be those that selectively etch the sacrificial material at an etch rate greater than the respective materials utilized in the base 204 and/or the article 120. In an exemplary implementation, the base 204, 402 may be fabricated from aluminum, and the sacrificial material of the sacrificial plate 202 may be copper, tantalum, or combinations thereof. In such an implementation, a copper etchant, such as Cu APS-100, which is commercially available from Transene Company, Inc. of Danvers, Mass., may be utilized to selectively etch the copper versus the aluminum. Other etchants may be or include aluminum etchants, tantalum etchants, chromium etchants, copper etchants, gallium etchants, germanium etchants, gold etchants, hafnium etchants, indium etchants, indium tin oxide etchants, iron oxide etchants, magnesium oxide etchants, niobium etchants, nichrome etchants, nickel etchants, palladium etchants, tin etchants, titanium etchants, tungsten etchants, Transene STS SF6/O2, one or more acids (e.g., sulfuric acid, hydrochloric acid, etc.), or the like, or combinations thereof.

In an exemplary implementation, the sacrificial plate 202 may be a composite. For example, the sacrificial plate 202 may be composed of two or more materials, such as aluminum and copper (e.g., aluminum coated copper or copper coated aluminum). In such an implementation, the sacrificial plate 202 may be contacted with two or more etchants selective for any one or more of the materials. For example, the sacrificial plate 202 may first be contacted with a first etchant to etch a first material (e.g., copper) of the sacrificial plate 202, and subsequently contacted with a second etchant to etch a second material (e.g., aluminum) of the sacrificial plate 202.

Figure 4A:
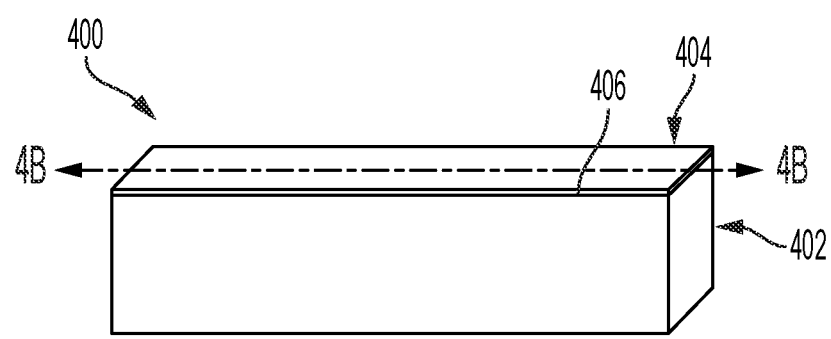
FIG. 4A illustrates a perspective view of another exemplary build plate that may be utilized in the 3D printer of FIG. 1, according to one or more implementations disclosed.
Figure 4B:
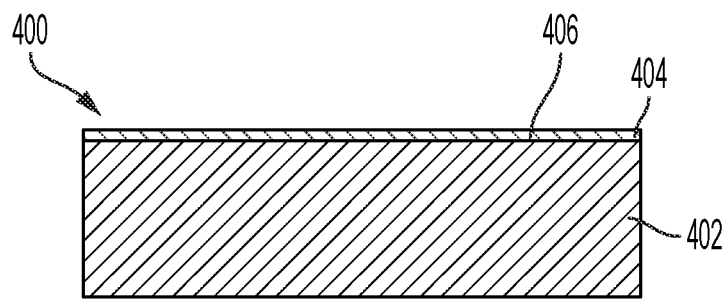
FIG. 4B illustrates a cross-sectional view of the exemplary build plate of FIG. 4A, according to one or more implementations disclosed.
Figure 4C:
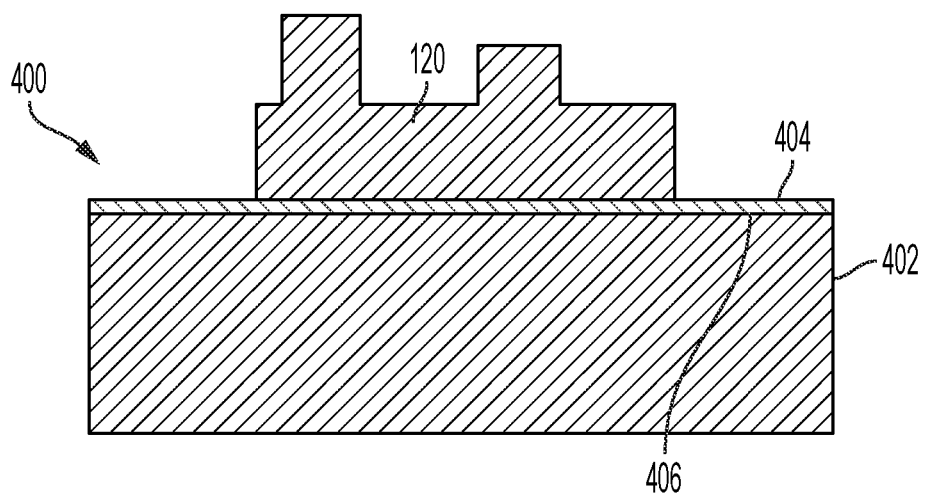
FIG. 4C illustrates a cross-sectional view of the build plate of FIG. 4A supporting a 3D printed article, according to one or more implementations disclosed.

FIG. 4A illustrates a perspective view of another exemplary build plate 400 that may be utilized in the 3D printer 100 of FIG. 1, according to one or more implementations. FIG. 4B illustrates a cross-sectional view of the exemplary build plate 400 of FIG. 4A, according to one or more implementations. FIG. 4C illustrates a cross-sectional view of the build plate 400 of FIG. 4A supporting the article 120, according to one or more implementations. As illustrated in FIGS. 4A-4C, the build plate 400 may include a base 402 and a sacrificial layer 404 disposed on or adjacent the base 402. The sacrificial layer 404 may be disposed adjacent at least a portion of the base 402 such that the sacrificial layer 404 at least partially covers a surface 406 thereof. For example, as illustrated in FIGS. 4A-4C, the sacrificial layer 404 may be disposed on or adjacent a top surface 406 of the base 402. It should be appreciated that the base 402, the sacrificial layer 404, and the article 120 may be fabricated from the same materials as the base 204, the sacrificial plate 202, and the article 120, respectively, as discussed above with reference to FIGS. 2A-2C.

The sacrificial layer 404 and the base 402 may be coupled with one another such that they provide a single monolithic build plate 400. For example, the sacrificial layer 404 may be disposed or otherwise deposited on the base 402 via any suitable method to thereby provide a coating or a layer on the base 402. For example, the sacrificial layer 404 may be electroplated, sputtered, welded, electroless plating, chemically bonded, dip coated, or the like, on the base 402 to thereby provide the build plate 400. The sacrificial layer 404 may have a thickness of from about 0.1 μm to about 100 μm. For example, the sacrificial layer 404 may have a thickness of from about 0.1 μm, about 0.5 μm, about 1 μm, about 5 μm, about 10 μm, about 30 μm to about 40 μm, about 60 μm, about 80 μm, or about 100 μm.

In an exemplary operation of the 3D printer 100 with continued reference to FIGS. 1 and 4A-4C, the sacrificial layer 404 may be deposited or disposed on the surface 406 of the base 402 via any suitable process (e.g., electroplating, sputtering, etc.) to fabricate the build plate 400, as illustrated in FIG. 4A. The 3D printer 100 may then fabricate and affix the article 120 on the build plate 400 adjacent the sacrificial layer 404 thereof, as illustrated in FIG. 4C. After fabricating the article 120 on the build plate 400, the article 120 may be separated from the base 402 of the build plate 400, and the base 402 may be reused by depositing another sacrificial layer 404. The article 120 may be separated from the base 402 of the build plate 400 via one or more processes. The build plate 400 may contain channels or pores (not shown) to allow etchant access to the sacrificial layer 404. For example, the base 402 of the build plate 400 may define through holes or channels extending therethrough (e.g., via a thickness) and capable of or configured to allow fluid communication from a bottom surface to the surface 406 of the base 402, thereby providing access to the sacrificial layer 404. The channels may have any size and/or shape, which may be at least partially dependent on the size and/or shape of the article 120 and/or the sacrificial layer 404. The etchant can be circulated through the base 402 to and from the sacrificial layer 404 in cycles. The same channels and pores may also be utilized for vacuum clamping the sacrificial layer 404 to the base 402.

In at least one implementation, the article 120 may be separated from the base 402 of the build plate 400 by any process capable of or configured to etch the sacrificial layer 404. For example, the sacrificial layer 404 and the base 402 may be separated from one another by wet or chemical etching with a liquid etchant or reactant, gaseous etching with a gas or vaporized etchant or reactant, plasma etching with a plasma formed with a gaseous etchant or reactant, electrochemical etching or electroetching, or any combination thereof. It should be appreciated that any etching process may be utilized and the particular etching process selected may be at least partially determined by the etch rate (e.g., Å/min, cycles, etc.), geometry (e.g., size and/or shape) of the article 120 and/or the sacrificial layer 404, exposed surface of the article 120 and/or the sacrificial layer 404, selectivity of the etching for the sacrificial layer 404 relative to the base 402 and/or the article 120, or the like, or any combination thereof.

In an exemplary implementation, the sacrificial layer 404 and the base 402 are separated from one another by wet or chemical etching. For example, the sacrificial layer 404 may be contacted with an etchant to remove portions or layers thereof to thereby separate or release the article 120. In at least one implementation, the build plate 400 including the base 402 and the sacrificial layer 404 having the article 120 coupled therewith may be at least partially immersed in the etchant disposed in a vessel. It should be appreciated that the vessel may be similar to the vessel 300 described above with respect to FIG. 3.

In at least one implementation, a coating may be disposed on or about the article 120, the base 204, 402, the sacrificial layer 404, and/or the sacrificial plate 202 prior to etching. The coating may be capable of or configured to at least partially protect a respective surface of the article 120, the base 204, 402, the sacrificial layer 404, and/or the sacrificial plate 202 from the etchant. The coating may be a temporary coating, such as a conformal coating. For example, the coating may be a thin polymeric film capable of or configured to conform to the contours of the article 120, the base 204, 402, the sacrificial layer 404, and/or the sacrificial plate 202 to protect the respective surfaces thereof. The coating may be applied in any suitable process or methods. For example, the coating may be applied via brushing, spraying, dip coating, or the like, or any combination thereof. Illustrative materials utilized for the coating may be or include, but are not limited to, acrylics, silicones, urethanes, parylene, or the like, or any combination thereof.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A build plate for an additive manufacturing device, the build plate comprising:
    a base; and
    a sacrificial plate coupled with the base,
    wherein an etch rate of the sacrificial plate in an etchant is greater than an etch rate of the base in the etchant,
    wherein the sacrificial plate comprises one or more protuberances that are integral with the sacrificial plate,
    wherein the one or more protuberances extend through an entire dimension of the base, and
    wherein the sacrificial plate and the base are coupled with one another via the one or more protuberances.

2. The build plate of claim 1, wherein the build plate is configured to support a 3D printed article, and wherein the etch rate of the sacrificial plate in the etchant is greater than an etch rate of the 3D printed article in the etchant.

3. The build plate of claim 1, wherein a ratio of the etch rate of the sacrificial plate to the etch rate of the base is greater than or equal to about 10.

4. The build plate of claim 1, wherein a ratio of the etch rate of the sacrificial plate to the etch rate of the base is greater than or equal to about 100.

5. The build plate of claim 1, wherein at least one of the protuberances define threading configured to facilitate the coupling of the sacrificial plate with the base.

6. The build plate of claim 1, wherein the base and the sacrificial plate are further coupled with one another via one or more mechanical fasteners.

7. The build plate of claim 6, wherein the mechanical fasteners comprise one or more of a threaded stud, a bolt, a clamp, or combinations thereof.

8. The build plate of claim 1, wherein the sacrificial plate comprises a thickness of from about 0.1 μm to about 5 mm.

9. An additive manufacturing layering device, comprising a print head and the build plate of claim 1 disposed proximal the print head.

10. The build plate of claim 1, wherein the base is fabricated from one or more metals and/or alloys, wherein the one or more metals and/or alloys comprises one or more of aluminum, an aluminum alloy, brass, bronze, chromium, a cobalt-chrome alloy, copper, a copper alloy, an iron alloy, nickel, a nickel alloy, a nickel-titanium alloy, stainless steel, tin, titanium, a titanium alloy, gold, silver, molybdenum, tungsten, or a combination thereof.

11. The build plate of claim 1, wherein the sacrificial plate is fabricated from one or more sacrificial materials, an alloy incorporating the one or more sacrificial materials, or a composite incorporating the one or more sacrificial materials, wherein the one or more sacrificial materials comprises one or more of copper, tantalum, aluminum, chromium, gallium, germanium, gold, hafnium, indium, indium tin oxide, iron oxide, magnesium oxide, niobium, nichrome, nickel, palladium, tin, titanium, tungsten, or a combination thereof.

12. The build plate of claim 1, wherein the base is fabricated from aluminum, wherein the sacrificial plate is fabricated from a sacrificial material, and wherein the sacrificial material comprises copper, tantalum, or a combination thereof.

13. The build plate of claim 1, wherein the sacrificial plate comprises one or more second protuberances that are integral with the sacrificial plate, and wherein the one or more second protuberances extend through less than the entire dimension of the base.

14. The build plate of claim 13, wherein the sacrificial plate and the base are not coupled with one another via the one or more second protuberances.

15. The build plate of claim 1, further comprising a vessel defining a ledge on an inner surface thereof, wherein the sacrificial plate is configured to be positioned within the vessel and to contact the ledge, thereby dividing an inner volume of the vessel into an upper portion and a lower portion that are not in fluid communication with one another.

* * * * *